(No Model.)
S. O. WHITE.
CHUCK.
No. 347,676. Patented Aug. 17, 1886.
Fig 1
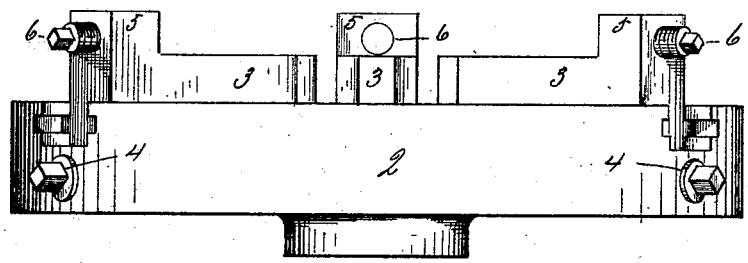
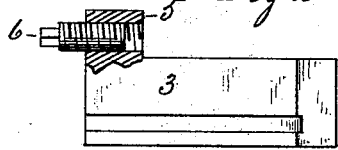
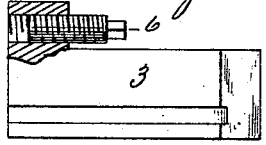
Fig 4
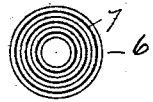
Fig 5
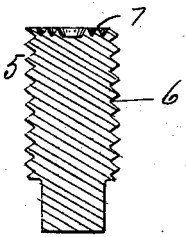
WITNESSES:
G. M. Chamberlain
Hu H Chapin
INVENTOR.
Samuel O White
BY
Chapin & Co
ATTORNEYS

UNITED STATES PATENT OFFICE.

SAMUEL O. WHITE, OF WINDSOR LOCKS, CONNECTICUT.

CHUCK.

SPECIFICATION forming part of Letters Patent No. 347,676, dated August 17, 1886.

Application filed May 3, 1886. Serial No. 200,914. (No model.)

*To all whom it may concern:*

Be it known that I, SAMUEL O. WHITE, a citizen of the United States, residing at Windsor Locks, in the county of Hartford and State of Connecticut, have invented new and useful Improvements in Sliding-Jaw Chucks, of which the following is a specification.

This invention relates to improvements in universal and other chucks embodying in their construction jaws adapted to be moved thereon in the plane of their rotation toward and from their center, the object being to provide for said chuck-jaws improved adjustable clamping-dogs, whereby the work held by said chuck is prevented from revolving within the jaws thereof.

In the drawings forming part of this specification, Figure 1 is a side elevation of a universal chuck having applied to the jaws thereof of my improved clamping-dogs. Figs. 2 and 3 are side elevations, partly in section, of two of the jaws of said chuck, each provided with said clamping-dog. Fig. 4 is an end elevation, and Fig. 5 is a longitudinal section, of the clamping-dog.

In the drawings, 2 indicates the body of the chuck, 3 the jaws thereof, and 4 the jaw-screws, said chuck parts being constructed and operated in the manner well known to mechanics, said screws 4 being adapted to actuate the jaws 3, whereby the latter are moved toward and from the center of said chuck. The projecting portions 5 of the chuck-jaws 3 are adapted to have their inner sides clamped against metal bars or other articles which are held and rotated by the chuck when the latter is placed in a lathe, and one great inconvenience in using said chucks for so holding work arises from the liability of said chuck-jaws to slide on the piece, against which they are forced by the screws 4, thereby failing to rigidly hold said piece when a turning-tool is brought against it, for as ordinarily constructed dependence is placed solely upon the forced frictional contact of the said inner side of the projections 5 on the jaws 3 with the piece clamped in the chuck for rigidly holding the latter.

To obviate the above-described inconven- ience in using chucks as ordinarily made, I provide for each jaw thereof an adjustable screw-dog, 6, passing through said projections 5 of the jaws 3 of the chuck in the line of the movement of said jaws, as shown. Said clamps 6 are suitably screw-threaded, and provided with a squared shank at one end to adapt them to be turned by a suitable wrench, and the opposite end thereof is provided with a series of annular sharp-edged corrugations, 7, and by turning said screw-clamps in the jaws after the latter have been screwed tightly against a piece of work in the chuck said clamps, by reason of their said corrugated ends, become more or less embedded in the surface of said piece in the chuck, and consequently the article so secured in the chuck to be turned is rigidly connected with the latter, and the before-mentioned slipping is obviated.

Fig. 2 illustrates one of the jaws of the chuck, showing the projection 5 thereon in section and the screw-clamp 6 therein, the said corrugated end of the latter being shown in said figure as opposite the center end of the jaw, as shown in Fig. 1; but in Fig. 3, in which substantially the same view of the jaw is shown, the screw-clamp is shown with its corrugated end toward the outer end of the jaw, and said screw-clamps may be used in either of said two positions. When said chucks are used, as they frequently are, for turning pulleys or rings, wherein it is desirable to engage the chuck-jaws with the inner side of the pulley rim or ring, said jaws are moved outward to secure the piece to be turned onto the chuck, and in such cases the screw-clamp 6 is put through the projection 5 of the chuck-jaw in the direction shown in Fig. 3, and to firmly secure the pulley or ring to the chuck after the jaws have been moved outward, as aforesaid, against it, said screw-clamp is screwed outward against the same, instead of in the opposite direction, as above described, when the work is secured between the inner faces of the projections 5 on the chuck-jaws. The sharp-edged annular rings 7 on the end of said screw-clamp 6, which constitute said corrugations, provide means for efficiently engaging the corrugated end of the screw-clamp with the work in the chuck, thereby compelling the latter to rotate infallibly with the chuck while being turned.

What I claim as my invention is—

The combination, with the sliding jaws of a chuck, substantially as described, of the screw-clamps 6, having the annular corrugations 7 on one end, passing through each of said jaws and adjustable in the latter in the direction of the movement of said jaws, substantially as set forth.

SAMUEL O. WHITE.

Witnesses:
 G. M. CHAMBERLAIN,
 WM. H. CHAPIN.